Mar. 13, 1923.

F. M. FURBER 1,448,658

AUTOMOBILE LOCK

Filed Nov. 5, 1920

INVENTOR
Frederick M. Furber,
By his atty,
J. H. McCready.

Patented Mar. 13, 1923.

1,448,658

UNITED STATES PATENT OFFICE.

FREDERICK M. FURBER, OF REVERE, MASSACHUSETTS.

AUTOMOBILE LOCK.

Application filed November 5, 1920. Serial No. 421,948.

*To all whom it may concern:*

Be it known that I, FREDERICK M. FURBER, a citizen of the United States, residing at Revere, in the county of Suffolk and State of Massachusetts, have invented certain Improvements in an Automobile Lock, of which the following description, in connection with the accompanying drawings, is a specification, like reference characters on the drawings indicating like parts in the several figures.

The locking of an automobile against theft presents a very difficult problem in urban districts due to the fact that police regulations usually require that a car shall not be locked in such a manner that it cannot be moved in case of fire or other emergency. In many cities the regulations also require that a car shall be left in such a manner that it can be moved around a corner. It is, therefore, an exceedingly difficult matter to comply with these requirements and still secure a car in such a manner that it cannot be stolen and driven away. To devise a practical solution of this problem constitutes the chief object of the present invention.

To the accomplishment of this object this invention provides a novel form of lock designed to be secured to the steering wheel of an automobile. Many forms of steering wheel locks have been proposed heretofore but practically all of them, so far as I have been able to learn, are either open to the objection that they do not comply with the police regulations above mentioned, or else that they are so constructed that they can be easily broken or otherwise put out of commission. It is an important object of this invention, therefore, to devise a steering wheel lock which shall not be open to either of these objections, which can be economically manufactured, shall be convenient to operate, and can readily be installed.

The nature of the invention will be readily understood from the following description when read in connection with the accompanying drawings, and the novel features will be particularly pointed out in the appended claims.

Referring now to the drawings.

Figure 3:
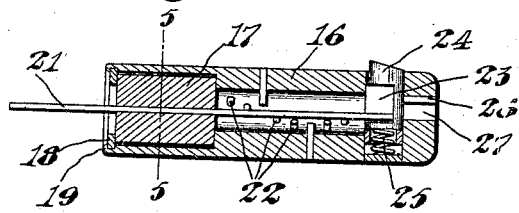
Fig. 3 is a cross sectional view of the locking bolt.
Figure 4:
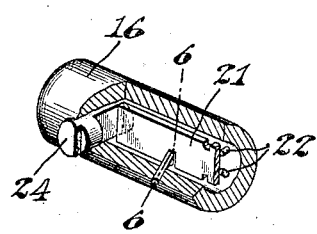
Fig. 4 is an angular view of the device shown in Fig. 3.
Figures 5, 6:
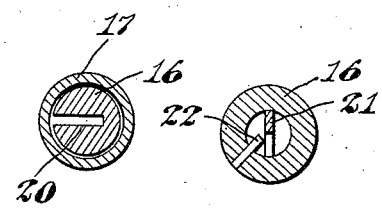

Figs. 5 and 6 are cross sectional views on the lines 5—5 and 6—6 of Figs. 3 and 4, respectively.

The construction shown comprises a body portion 2 secured to one of the spokes 3 of the steering wheel 4, an arm 5 movably mounted in said body part 2, and a locking device which is operable to secure said arm in different positions of adjustment relatively to said body part.

Figure 2:
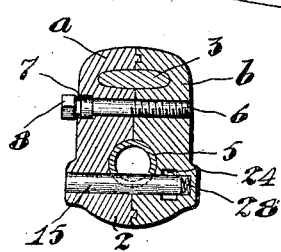
Fig. 2 is a cross sectional view taken substantially on the line 2—2, Fig. 1.

The body part may be secured to the steering wheel in any convenient manner, or may be made integral therewith, but, as shown, this body part is made in two pieces designated at *a* and *b*, respectively, these parts being shaped to embrace the spoke 3, and being secured together by two bolts or screws 6 of unique construction. As shown in Fig. 2, each of these bolts is provided with a threaded part to engage the internal threads on the body member *b*, and it has a cylindrical head or shouldered portion 7 designed to enter a deep counter-sink or recess in the body member *a*. This shoulder 7 is connected by a reduced neck or weakened part with a squared head 8. The parts *a* and *b*, preferably are fitted on the spoke 3, this spoke if necessary being wound with tape or leather in case it is smaller than the recess provided for it in the body part 2, and the two parts *a* and *b* of the body are then secured permanently to the spoke 3 by threading in the bolts 6—6. The squared head 8 of each bolt provides a convenient grip for the wrench, and the relatively weak or breakable neck between the parts 7 and 8 has ample strength to transmit all the force necessary to turn the bolt up securely. After this securing operation has been performed, however, the head 8 then may be twisted off the bolt so that it would be exceedingly difficult, if not impossible, to back out the bolt.

Figure 1:
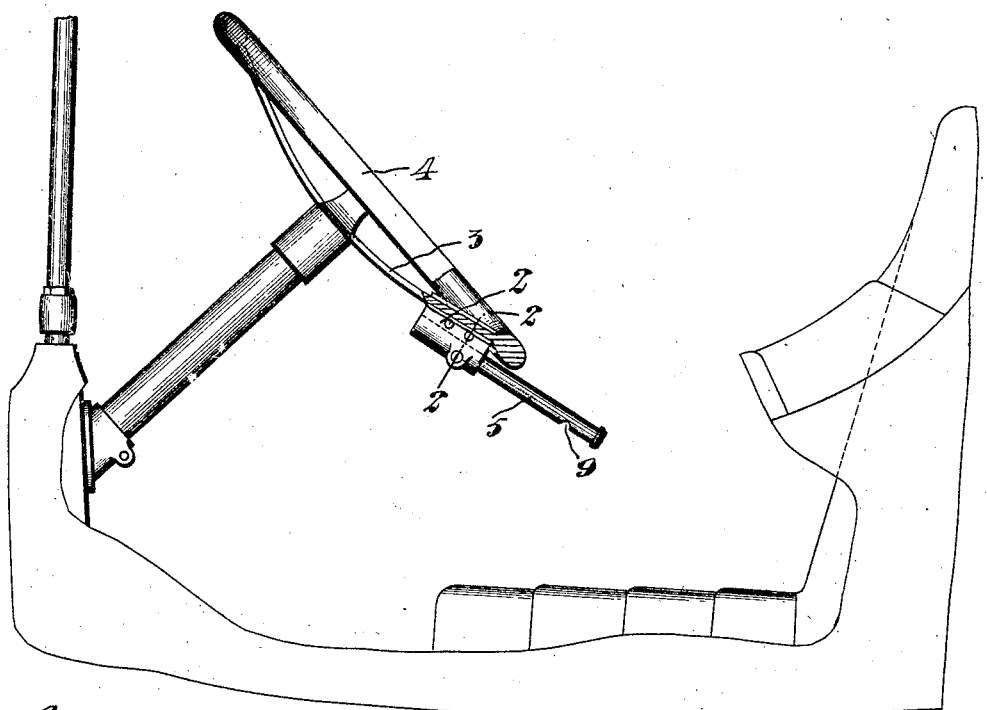
Figure 1 is a side elevation, partly in vertical cross section, showing a locking device mounted in its operative position on the steering wheel of an automobile, certain parts of the automobile only being shown.

The arm 5 consists of a tube provided with heads at its opposite ends and it is mounted to slide in the body 2 toward and from the axis of rotation of the steering wheel. This arm is considerably longer than the body part and is of such a length that when in its projected position, as shown in Fig. 1, it would be impossible for a person to sit in the driver's seat and drive the car in the usual or normal manner. That is, the arm 5 would prevent the normal turning movements of the wheel necessary to drive the car around a corner due to the fact that it would engage either the person of the driver or relatively stationary parts of the car. In other words, the presence of this extension or arm 5 would make it impossible for a person to sit in the driver's seat and operate the wheel in the manner necessary to drive even a relatively short distance in most localities due to the fact that the wheel could not be turned to the extent required.

For the purpose of locking the arm 5 in either its projected or retracted position, the arm is notched on its lower side near each end, one of these notches being shown at 9, Fig. 1, and the body part 2 is provided with a socket to receive a locking device shown in Figs. 3 and 4 which cooperates with either of the notches in the arm to secure it in either its operative or inoperative relationship to the body, it being understood that the operative relationship is its extended or projected position, while its inoperative relationship is its retracted or collapsed position. This locking device is in the form of a bolt indicated in general at 15, Fig. 2, and it is removably supported in the body 2.

Referring to Figs. 3 and 6 it will be seen that this locking device comprises a hollow cylinder 16 having a cylindrical barrel 17 rotatably mounted in one end thereof, this barrel being held in position by a washer 18 which, in turn, is held in place by the crimped in end 19 of the cylinder. The barrel 17 is slotted, as shown at 20, Fig. 5, to receive a key 21, and a series of pins 22 are fixed in the wall of the cylinder 16 and project into the bore of the cylinder, these pins of course being located differently in different locking devices, and each key being provided with suitable slots to receive the pins of the particular lock for which it is made. The extreme inner end of the key 21 projects into a notch or cut-out portion 23 in a latch 24 which is located in a transverse socket formed in the end portion of the cylinder 16. A spring 25, Fig. 5, tends to hold this latch in its projected position but the key 21, when turned with the barrel 17, exerts a cam action on the lower wall of the notch 23 and retracts the latch against the action of the spring 25. A pin 26 projects from the latch 24 into a slot 27 formed in the end of the cylinder and limits the range of movement of the latch.

As shown in Fig. 2, the body 2 is provided with a socket to receive the locking bolt 15 and when the arm 5 is moved to bring either one of its notches into register with the socket in the body part, the locking bolt 15 may then be slipped into position, as shown in Fig. 2, the latch 24 snapping into a notch formed in the body and securely holding the arm 5 in its adjusted position in the body part. When it is desired to release the arm 5 the driver inserts the proper key 21 in the slot 20 and retracts the latch 24 in the manner above described, whereupon a spring 28, Fig. 2, which is seated in the end of the socket and bears against the inner end of the locking bolt, forces this bolt outwardly. This bolt may then be completely withdrawn, the arm 5 may be adjusted to a new position and locked in that position by again replacing the locking bolt in the manner above described.

Both the body part 2 and the arm 5 of this locking device preferably are hardened so that they cannot be cut or filed, and the body member 2 should be secured to the spoke 3 as close to the rim of the wheel as possible so as to prevent the removal of the device simply by cutting the spoke at each end of the body.

The locking bolt provided by this invention is of particular utility in a device of this character since it is exceedingly difficult to pick this lock or to break it or put it out of commission in any manner. The fact that it is substantially enclosed in the body 2 makes it impossible to drive or pull it out or to break it or unlock it by any of the methods or tools ordinarily employed by automobile thieves.

It will now be appreciated that this invention provides a locking device which while effectually preventing the theft of the car, still complies with the regulations above described since it is merely necessary in order to move the car to stand on the running board and manipulate the wheel for the short distance necessary to move the car for these purposes. The wheel can be turned in this manner sufficiently to move the car around a corner if that should be desired.

While I have herein shown and described an embodiment of the invention now preferred by me, it will readily be understood that this embodiment may be modified in many particulars within the skill of the mechanic and the discretion of the designer without departing from the spirit or scope of this invention. It will also be understood that some of the features of this invention, particularly of the locking bolt and the means for securing the body 2 to the steering wheel, are applicable to other relationships than that specifically disclosed herein.

The locking bolt per se is not claimed in this application but the right is reserved to claim it in a divisional application.

What is claimed as new is:

1. The combination with the steering wheel of an automobile, of a locking attachment for said wheel comprising a body portion secured fast to said wheel, an arm separate from said body but supported thereby and of such a length as to project away from said wheel into a position preventing the normal driving of the automobile but permitting a limited movement of said wheel, and a lock operative to hold said arm in said projecting position but releasable to permit the movement of said arm relatively to said body portion out of said position.

2. The combination with the steering wheel of an automobile, of a locking attachment for said wheel comprising a body portion secured fast to said wheel, a rigid arm mounted on said body portion for movement into either an operative position in which it prevents the normal driving of the automobile or into an inoperative position in which it permits said normal driving, and a lock for securing said arm in its operative position.

3. The combination with the steering wheel of an automobile, of a locking attachment for said wheel comprising a body portion secured fast to said wheel, a rigid arm mounted on said body portion for movement into either an operative position in which it prevents the normal driving of the automobile or into an inoperative position in which it permits said normal driving, and a lock for securing said arm in either of said positions.

4. The combination with the steering wheel of an automobile, of a locking attachment for said wheel comprising a body portion secured fast to said wheel, a rigid arm mounted on said body portion for sliding movement into either an operative or inoperative position, and a lock for securing said arm in its operative position.

5. The combination with the steering wheel of an automobile, of a locking attachment for said wheel comprising a body portion secured fast to said wheel, a rigid arm mounted on said body portion for sliding movement toward or from the axis of rotation of said wheel, and a lock carried by said body portion and operative to secure said arm in different positions of adjustment relatively to said axis.

6. The combination with the steering wheel of an automobile, of a locking attachment for said wheel comprising a body portion secured fast to said wheel, an arm separate from said body but supported thereby and of such a length as to project away from said wheel into a position preventing the normal movement of said wheel but permitting a limited movement thereof, and a lock substantially enclosed in said body part and operative to hold said arm in said projected position, said lock being releasable to permit the movement of said arm relatively to said body out of said position.

7. A lock for the steering wheel of an automobile comprising a body part, a rigid arm movable relatively to said body part into either a projected or retracted position, and a lock for securing said arm in its projecting relationship to said body part.

8. A lock for the steering wheel of an automobile comprising a body part, a rigid arm collapsible with reference to said body part, and a lock for securing said arm in its extended relationship to said body portion.

9. A lock for the steering wheel of an automobile comprising a body part, a rigid arm movable relatively to said body part into either a projected or retracted position, and a locking device carried by said body part for securing said arm in its projected relationship to said body part, said locking device being removably mounted in said body part.

10. A lock for the steering wheel of an automobile comprising a body part, a rigid arm slidably mounted in said body part for movement into either a projected or retracted position, and a lock for securing said arm in its projected position.

11. A lock for the steering wheel of an automobile comprising a body part, a rigid arm longer than said body part and mounted thereon for movement relatively to said body part into either a collapsed or projected position, and a lock mounted in said body part and operative to secure said arm in said projected position.

12. A lock for the steering wheel of an automobile comprising a body part, a rigid arm movable relatively to said body part into either a projected or retracted position, and a lock substantially enclosed in said body part and operative to secure said arm in either of said positions.

13. The combination with an automobile having a steering wheel, of a locking device for said wheel comprising a body part secured in a relatively fixed position to said wheel, and a rigid arm projecting away from said wheel into a position preventing the normal driving of the automobile, said arm being mounted for movement relatively to said body part when said device is unlocked but secured against said movement when the device is locked.

14. The combination with an automobile having a steering wheel, of a locking device for said wheel comprising a body part secured in a relatively fixed position to said wheel, a rigid arm projecting away from said wheel into a position preventing the normal driving of the automobile, said arm being mounted for movement relatively to said body part, and a lock controlling said movement.

15. The combination with an automobile having a steering wheel, of a locking device for said wheel comprising a body part secured in a relatively fixed position to said wheel, a rigid arm projecting away from said wheel into a position preventing the normal driving of the automobile, said arm being mounted for movement relatively to said body part, and a lock mounted in said body part and operative when locked to prevent any substantial movement of said arm relatively to said body part but permitting such movement when unlocked.

In testimony whereof I have signed my name to this specification.

FREDERICK M. FURBER.